United States Patent [19]

Piacenti et al.

[11] Patent Number: 4,902,538

[45] Date of Patent: Feb. 20, 1990

[54] PROCESS FOR THE PROTECTION OF STONE MATERIALS, MARBLE, BRICKS AND CONCRETE FROM ATMOSPHERIC AGENTS AND POLLUTANTS AND FOR THE PROTECTION OF THE SURFACE OF SUCH MATERIALS FROM THE DECAY CAUSED BY MURAL WRITINGS WITH PAINTS, AND THE LIKE

[75] Inventors: Franco Piacenti, Florence; Carlo Manganelli Del Fa', Grosseto; Giovanni Moggi; Adolfo Pasetti, both of Milan; Andrea Scala, Florence, all of Italy

[73] Assignees: Ausimont S.p.A., Milan; Consiglio Nazionale Della, Rome, both of Italy

[21] Appl. No.: 221,592

[22] Filed: Jul. 20, 1988

[30] Foreign Application Priority Data

Jul. 27, 1987 [IT] Italy .............................. 21468 A/87
Dec. 11, 1987 [IT] Italy .............................. 22950 A/87

[51] Int. Cl.$^4$ .............................................. B05D 3/02
[52] U.S. Cl. .................................. 427/393.6; 428/422; 428/540
[58] Field of Search .................... 427/393.6; 428/540, 428/422

[56] References Cited

U.S. PATENT DOCUMENTS 4,499,146 2/1985 Piacenti et al. ................. 428/540 X
4,745,009 5/1988 Piacenti et al. ................. 427/393.6
4,746,550 5/1988 Strepparola et al. ........ 427/393.6 X Primary Examiner—Michael Lusignan
Attorney, Agent, or Firm—Stevens, Davis, Miller & Mosher

[57] ABSTRACT

Process for the protection of stone materials, marble, bricks, and concrete, and of structures made from such materials, against the decay caused by atmospheric agents and pollutants, by applying to the surface of said materials or structures a mixture which is constituted by:

(1) polytetrafluoroethylene in the form of a fine powder;
(2) a perfluoropolyether not bearing functional groups; and/or
(3) a perfluoropolyether or a fluoropolyether having a chain end, or both chain ends, constituted by functional groups which are capable of forming a chemical and/or physical bond with the material to be protected.

The invention also relates to a process for preventing, on the normal materials for building industry and lining materials, the decay effects caused by writings made by using spray paits or brush paints, inks, and the like.

17 Claims, No Drawings

PROCESS FOR THE PROTECTION OF STONE MATERIALS, MARBLE, BRICKS AND CONCRETE FROM ATMOSPHERIC AGENTS AND POLLUTANTS AND FOR THE PROTECTION OF THE SURFACE OF SUCH MATERIALS FROM THE DECAY CAUSED BY MURAL WRITINGS WITH PAINTS, AND THE LIKE

DESCRIPTION OF THE INVENTION

The present invention relates to a process for the protection of stone materials, marble, bricks, and concrete and to structures made from such materials, from atmospheric agents and pollutants.

It is known that the decay of building materials, such as marble, stone, bricks, and concrete, and of structures built from such materials, is caused by chemical and physical phenomena, both of which take place in the presence of water.

A physical phenomenon which acts on all building materials is that due to the succession of freezing and thawing, which causes water absorbed inside the pores of these materials to freeze and the resulting ice to melt, with changes in specific volume, and with stresses which cause fractures, or at least the separation of the individual particles or units which constitute the building material or structure.

Another chemical-physical phenomenon is the process of dissolution in water of the limestone which is present in the marbles as their essential component, and in the stones as the binder, with the consequent de-cohesion of the granules.

Even more important for the decay of the materials and of the structures exposed to outdoor environments is a set of phenomena of a chemical nature: these are essentially constituted by the attack of carbonate portions of the material, or of the structure, by the agents and polluting substances contained in atmospheric air (carbon dioxide sulphur dioxide, nitrogen oxides, hydrogen chloride, hydrogen sulphide). Such pollutants react with the material in thence of water, and their concentration is particularly high at the beginning of rainy phenomena.

It is known as well that in order to eliminate, or at least to reduce to a meaningful extent, the above drawbacks, the speed of penetration of water from the external environment into the interior of the material to be protected must be considerably reduced.

In order to achieve this purpose chemical compounds exerting a water-repellant action are usually applied to the outer surface of the material to be protected.

U.S. Pat. No. 4,499,146 discloses the use for such a purpose of neutral perfluoropolyethers, i.e., perfluoropolyethers not having functional groups. European patent application Nos. 192,493 and 215,492 disclose the use of perfluoropolyethers wherein either a chain end, or both chain ends, are constituted by functional groups, such as amide groups or ester groups. The same European patent applications also disclose the use of functionalized perfluoropolyethers in admixture with neutral perfluoropolyethers.

The use of these perfluoropolyethers, either functionalized or not, gives good results in the protection of marble and of stones with low and medium porosity. Less good results are obtained with high-porosity materials, i.e., with materials having 20-40%, or more, of porosity.

An object of the present invention is to provide a process which provides excellent protection both to low- or medium-porosity materials, as well as to high-porosity materials.

Another object is to provide a process which, with the same amount of protecting agents relative to both functionalized and non-functionalized perfluoropolyethers, provides a better protection.

These and still other objects are achieved by the process of the present invention for the protection of stone materials, marble, bricks and concrete, and of structures built with such materials, from atmospheric agents and pollutants, by the application of protective agents on the surface of said materials and structures. This process is characterized in that the protective agents are constituted by a mixture of:

(1) polytetrafluoroethylene, or a tetrafluoroethylene copolymer containing up to 12 mol % of other perfluorinated monomers, with said homopolymer or copolymer being used in the form of a fine powder;

(2) a perfluoropolyether not having functional groups; and/or (3) a perfluoropolyether or a fluoropolyether having a chain end, or both chain ends, constituted by a functional group capable of forming a chemical and/or physical bond with the material to be protected, or a product of polycondensation or ethylenic polymerization of the above-said functionalized perfluoropolyether or fluoropolyether.

As tetrafluoroethylene copolymers suitable for use in the present invention, those may be cited for example which contain up to 10 mol % of hexafluoropropene and up to 5 mol % of perfluoroalkyl-perfluorovinyl-ethers, and in particular perfluoropropyl-perfluorovinyl-ether used in an amount up to 3 mol %.

The average molecular weight of the tetrafluoroethylene homopolymer or copolymer is generally within the range of from 100,000 to 2,000,000.

The average size of the primary homopolymer or copolymer particles is generally within the range of from 0.05 to 0.5 microns.

The average molecular weight of the perfluoropolyether not containing functional groups is generally within the range of from 3,000 to 16,000, while that of the functionalized perfluoropolyether or fluoropolyether is generally within the range of from 500 to 20,000.

The perfluoropolyethers not having functional groups and the functionalized perfluoropolyethers may have oxyperfluoroalkylene units belonging to the following types:

(I) ($CF_2-CF_2O$) and ($CF_2O$), with such units being randomly distributed throughout the perfluoropolyether chain; or (II)

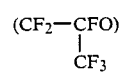

and ($CFXO$), wherein X is either F or $CF_3$, with said units being randomly distributed throughout the chain; or (III) ($CF_2-CF_2O$)

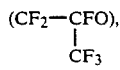

and (CFXO) wherein X is either F or $CF_3$, with such units being randomly distributed throughout the chain; or (IV)

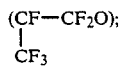

or (V) $(CF_2-CF_2-CF_2O)$; or (VI)

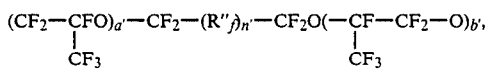

wherein $R''_f$ is a fluoroalkylene group; n' is either 0 or 1; a' and b' are integers, and the sum of (a'+b') is equal to or higher than 2; or (VII) $(CF_2-CF_2O)$; or (VIII)

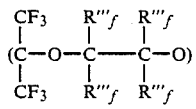

wherein the $R'''_f$ groups, either equal to or different from one another, are a fluorine atom or a perfluoroalkyl group; or (IX) $(CF_2O-CF_2-CF_2O)$.

The functionalized fluoropolyethers may have the following units:

(X) $(CH_2-CF_2-CF_2O)$; or (XI) $(CF_2-CF_2-CH_2O)_{p'}-R^{iv}_f-O-(CH_2-CF_2-CF_2O)_{q'}$ wherein $R^{iv}_f$ is a fluoroalkylene group and p' and q' are zero or integers, and the sum of (p'+q') is equal to or higher than 2.

Examples of functional groups of the functionalized perfluoropolyethers and fluoropolyethers are disclosed in detail in the following.

To the neutral perfluoropolyethers (i.e., perfluoropolyethers not bearing functional groups) and functionalized perfluoropolyethers and fluoropolyethers to be used in the mixture of protective agents of the present invention, those belong which are disclosed in the above-cited U.S. Pat. No. 4,499,146, and in above-cited European patent application Nos. 192,493 and 215,492, whose contents are incorporated by reference in the present application. For a description of these and still other neutral perfluoropolyethers and functionalized perfluoropolyethers and fluoropolyethers, and of their manufacturing process, reference is also made to U.S. Pat. Nos. 3,242,218, 3,655,041, 3,715,378, 3,810,874, 3,847,978 and 4,523,039; to Italian Pat. No. 903,446; to European patent application Nos. 148,492, 151,877 and 224,201, and to International patent application Nos. WO 87/00538 and WO 87/01992.

As the neutral perfluoropolyethers, for example, those belonging to the following classes are used:

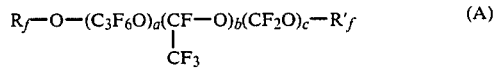

wherein $R_f$ and $R'_f$, either equal to or different from each other, are selected from the group consisting of $CF_3$, $C_2F_5$ $C_3F_7$; the $C_3F_6O$ (oxytrifluoromethyl-trifluoroethylene),

and $CF_2O$ units are randomly distributed throughout the chain; a is an integer; b and c are integers or zero; and when the sum of (b+c) is different from zero, the ratio a/(b+c) is within the range of from 5 to 40. The average molecular weight is within the range of from 4,000 to 10,000.

(B) $CF_3O-(C_2F_4O)_d(CF_2O)_e-CF_3$ wherein the $C_2F_4O$ and $CF_2O$ units are randomly distributed throughout the chain; d and e are integers; and the d/e ratio is within the range of from 0.3 to 5.

The average molecular weight is within the range of 3,000 to 16,000.

(C) $CF_3O-(C_3F_6O)_f(C_2F_4O)_g(CFXO)_h-CF_3$ wherein the $C_3F_6O$, $C_2F_4O$ and CFXO units are randomly distributed throughout the chain; f, g and h are integers; the f/(g+h) ratio is within the range of from 1 to 50; the g/h ratio is within the range of from 1 to 10; X is either F or $CF_3$; and the average molecular weight is within the range of from 4,000 to 12,000.

(D) $R^3_fO-(CF_2CF_2CF_2O)_jR^4_f$ wherein $R^3_f$ and $R^4_f$, either equal to or different from each other, are $-CF_3$ or $-C_2F_5$; and j is an integer having such a value that the average molecular weight is within the range of from 4,000 to 16,000.

As the functionalized perfluoropolyethers, for example those belonging to the following classes are used:

(E)

wherein: $R_f$ is a perfluoroalkyl group containing from 1 to 3 carbon atoms; the $C_3F_6O$,

and $CF_2O$ units are randomly distributed throughout the chain; a is an integer; b and c are integers or zero; when the sum of (b+c) is different from zero, the a/(b+c) ratio is within the range of from 5 to 40. D is a $-CFX-COZ'$ groups, wherein X=F or $CF_3$ and $Z'=OH$, $OR^5$ or $NR^6R^7$, wherein $R^5$ is an alkyl group containing from 1 to 8 carbon atoms, an aromatic group or an alkylaromatic group, such as e.g., the benzyl radical; the aromatic group preferably contains either 6 or 10 carbon atoms, and the alkylaromatic group contains from 7 to 11 carbon atoms; the aromatic group may be substituted with alkyl groups (preferably containing from 1 to 3 carbon atoms) or polyethoxy groups (preferably containing from 1 to 6 ethoxy units. $R^6$ and $R^7$, either equal to or different from each other, may be an alkyl group containing from 1 to 8 carbon atoms, or a phenyl group substituted with alkyl groups or polyethoxy groups. The alkyl groups preferably contain from 1 to 3 carbon atoms. The polyethoxy groups preferably contain from 1 to 6 ethoxy units. The average molecular weight is within the range of from 500 to 10,000.

(F) $D'—(C_2F_4O)_d(CF_2O)_e—D'$ wherein the $C_2F_4O$ and $CF_2O$ units are randomly distributed throughout the chain; d and e are integers; the ratio of d/e is within the range of from 0.3 to 5; $D'=CF_2—COZ'$, wherein Z' has the above meaning; and the average molecular weight is within the range of from 1,000 to 20,000.

(G)

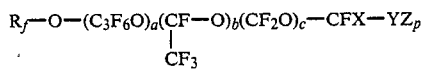

wherein: $R_f$ is a perfluoroalkyl group containing from 1 to 3 carbon atoms; the $C_3F_6O$, and $CF_2O$ units are randomly distributed throughout the chain; a is an integer; b and c are integers or zero; when the sum of (b+c) is different from zero, the a/(b+c) ratio is within the range of from 5 to 40. p may be 1 or 2; Y is either a divalent or a trivalent bridging organic radical. The average molecular weight is within the range of from 500 to 10,000. Z is a functional group capable of forming a chemical and/or physical bond with the material to be protected, and is selected from the group consisting of: Z1 is a non-aromatic, non-fluorinated organic radical not containing active hydrogen atoms, containing two or more heteroatoms, either equal to or different from one another, and selected from O, N, S, Se and P, which are donors of electronic doublets and are situated in 1-3. 1-4, or 1-5 position relative to one another, or an aromatic radical either containing or not containing heteroatoms, selected from those indicated above, and capable of generating coordination or charge-transfer bonds. These radicals are described in European patent application Nos. 165,649 and 165,650, whose contents are incorporated by reference in the present application.

An example of a suitable non-aromatic organic radical is:

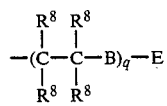

wherein $R^8$ is either H or an alkyl radical containing from 1 to 3 carbon atoms, E is an alkyl radical containing from 1 to 3 carbon atoms, B is either O or S, and q is 2 or 3.

An example of a suitable aromatic radical is:

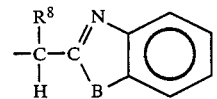

wherein $R^8$ and B have the above indicated meanings.
Another example of a suitable aromatic radical is:

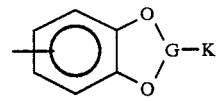

wherein G is $>CH—$ or $>CH—CH_2—$ and K is an H atom or an alkyl radical containing from 1 to 3 carbon atoms. Other suitable radicals are described in the above European applications. Z2 is a $—CONR^9R^{10}$ or $—COOR^{11}$ radical, wherein $R^{11}$ is an alkyl group containing from 1 to 8 carbon atoms, an aromatic group or an alkylaromatic group, such as, e.g., benzyl; the aromatic group preferably contains 6 or 10 carbon atoms and the alkylaromatic group preferably contains from 7 to 11 carbon atoms; the aromatic group may be substituted with alkyl groups (preferably containing from 1 to 3 carbon atoms) or polyethoxy groups (preferably containing from 1 to 6 ethoxy units). $R^9$ and $R^{10}$, either equal to or different from each other, have the same meaning as $R^{11}$; or a radical:

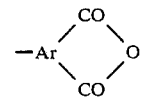

wherein Ar is an aromatic group preferably containing 6 or 10 carbon atoms; or an —OH; —NCO;

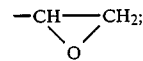

—NHR$^{11}$; —COR$^{11}$; or —SiR$^{12}{}_t$(OR$^{13}$)$_{3-t}$ radical, wherein $R^{12}$ and $R^{13}$, either equal to or different from each other, have the same meaning as $R^{11}$, and wherein t is zero, 1, or 2; Z3 is a radical containing a polymerizable unsaturation of the ethylenic type; Z4 is a radical belonging to the Z1 class of radicals containing one or more $R^{11}$ substituents, wherein $R^{11}$ has the above indicated meaning.

(H) $AO—(C_2F_4O)_k(CF_2O)_l—A'$ wherein the $C_2F_4O$ and $CF_2O$ units are randomly distributed throughout the chain; k and l are integers; the k/l ratio is within the range of from 0.3 to 5; $A'=—CFX—YZ_p$, A is A' or a perfluoroalkyl radical containing from 1 to 3 carbon atoms, and p, X,. Y and Z have the same meanings as stated above. The average molecular weight is within the range of from 1,000 to 20,000.

(J) $AO—(C_3F_6O)_f(C_2F_4O)_g(CFXO)_h—A'$, wherein the $C_3F_6O$, $C_2F_4O$ and CFXO units are randomly distributed throughout the chain; f, g and h are integers; the ratio of f/(g+h) is within the range of from 1 to 50; the ratio of g/h is within the range of from 1 to 10; A, A' and X have the same meanings as stated above; and the average molecular weight is within the range of from 500 to 20,000.

(K)

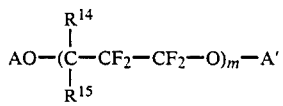

wherein $R^{14}$ and $R^{15}$, either equal to or different from each other, are selected from H, Cl and F; a fluorine atom in —CF$_2$— moieties may be substituted by H, Cl, a perfluoroalkoxy group (preferably containing from 1 to 12 carbon atoms) or a perfluoroalkyl group (preferably containing from 1 to 4 carbon atoms).

When the compound contains

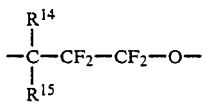

units which are different from one another, these units are randomly distributed throughout the chain; and m is an integer such that the average molecular weight is within the range of from 1,500 to 8,000.

The end groups belonging to the Z3 class are selected, in particular, from methacryl, acryl, cinnamic, vinyl, allyl, vinylether and allylether radicals.

The organic bridging radical Y may be for example: —CH$_2$O—, —CH$_2$—O—CH$_2$—, —CH$_2$(OCH$_2$CH$_2$-)$_n$— (wherein n is an integer within the range of from 1 to 3), —CF$_2$—, —CF$_2$O—, —CH$_2$—, —CONR$^{11}$—, —COO—, —COS—, —CO—, —CH$_2$NR$^{11}$—, —CH$_2$S—, wherein R$^{11}$ has the above meaning.

Other suitable bridging radicals Y are disclosed, as X or Y radicals, in U.S. Pat. No. 4,094,911, whose content is incorporated by reference in the present application.

The di-functionalized perfluoropolyethers belonging to the (F), (H), (J) and (K) classes may also be used, as explained in European patent application No. 215,492, in the form of their products of polycondensation with other polycondensible monomers, e.g., as polyurethanes, polyureas, polyesters, polyamides, polyethers, polyimides, and polyamic acids.

The monofunctional or difunctional perfluoropolyethers belonging to the (G), (H), (J) and (K) classes containing Z3 end groups, i.e., those containing a polymerizable unsaturation of the ethylenic type, may be also used in the form of their polymerization products, as disclosed in European patent application No. 215,492.

The polytetrafluoroethylene, or its copolymer used in the present invention, may be obtained by means of known methods,. It may be directly synthesized with the desired molecular weight, as described, e.g., by McCane in "Encyclopaedia of Polymer Science and Technology", Vol. 13, page 623, Interscience, New York, 1970.

As an alternative, by starting from an emulsion polymer or copolymer having a too high means molecular weight, such molecular weight may be reduced to the desired value by means of gamma radiation, as described, e.g., in the Journal of Applied Polymer Science, Vol. 26, page 1373, 1981.

The amount of polytetrafluoroethylene or of its copolymer in the mixture of protective agents according to the present invention is generally within the range of from 2 to 30% by weight, computed relative to the mixture. Preferably, the mixture contains from 10 to 20% thereof.

In the two-component mixtures, in addition to polytetrafluoroethylene or its copolymer, a neutral perfluoropolyether or a functionalized perfluoropolyether or fluoropolyether is used.

In the three-component mixtures, both said polyether types are present; in said three-component mixtures, the weight ratio of the functionalized perfluoropolyether or fluoropolyether to the neutral perfluoropolyether is equal to or higher than 0.01; said ratio is preferably within the range of from 0.1 to 0.6.

The neutral or functionalized polyether, or their admixture, may be used as such, o¢ dissolved in a chlorofluorocarbon or in a fluorocarbon. Particularly suitable is 1,1,2-trichloro-1,2,2-trifluoro-ethane. In this latter case, the solution usually contains from 30 to 90% by weight of polyether.

Inasmuch as polytetrafluoroethylene and its copolymers, are neither soluble in either functionalized or non-functionalized perfluoropolethers or fluoropolyethers, nor in said solvents, they are introduced into the mixture in the solid state. More precisely, by suitably stirring, a suspension is prepared of the polymer of copolymer in the liquid phase constituted by the polyether(s) and the possible solvent, and the suspension is applied to the materials or structures to be protected.

The application of the suspension of protective agents on the materials or structures is carried out by any convenient and suitable means: for example, by spraying an atomized— with or without compressed air—liquid stream, or by spreading by brush.

The amount of protective mixture to be applied to the surface to be protected may vary within wide limits, as a function of the nature of the material to be treated, and in particular, of its porosity. For porous materials larger amounts are used. Usually, amounts within the range of from 10 to 500 g per square meter of surface to be treated are used.

Except for those cases in which products are used which are derived from the polycondensation or ethylenic polymerization of functionalized perfluoropolyethers or fluoropolyethers, the protective composition may be removed from the materials and structures to which it has been applied by treating such materials and structures first with 1,1,2-trichloro-1,2,2-trifluoroethane in order to remove most of the composition, and then with compressed air, in order to remove the residues of polytetrafluoroethylene or its copolymer.

The present invention relates also to a process for preventing or annulling the effects of decay or deterioration of the normal materials used in the building industry and for linings, by the use of inks, spray paints or brush paints, colored chalks, posted placards, and so forth.

In accordance with this invention, it has been discovered that by using either a perfluoropolyether, or a fluoropolyether having at least one end group consisting of a functional group capable of forming a chemical and/or physical bond with the material to be protected, either alone, or, possibly in admixture with either of, or both products selected from the following classes:

(1) polytetrafluoroethylene, or a tetrafluoroethylene copolymer containing up to 12 mol % of other perfluorinated monomers, with said homopolymer or copolymer being used in the form of a fine powder, present in an amount within the range of from 2 to 30% by weight; and (2) a perfluoropolyether containing perfluoroalkyl end groups, surfaces of building materials having a porosity even higher than 10%, and preferably lower than 30%, may be protected over very long time periods.

As tetrafluoroethylene polymers, one may use, e.g., any of those indicated above.

The average molecular weight of the homopolymer or copolymer of tetrafluoroethylene is as indicated above.

The average size of the primary particles of homopolymer of copolymer is also as indicated above.

The average molecular weight of the perfluoropolyether not bearing functional groups, and the average molecular weight of the functionalized perfluoropolyether or fluoropolyether, is as indicated above.

The perfluoropolyethers not bearing functional groups and the functionalized perfluoropolyethers may contain oxyperfluoroalkylene units belonging to the types from (I) to (IX) described above.

The functionalized fluoropolyethers may contain the units (X) and (XI) described above.

As the functionalized perfluoropolyethers there are used, e.g., those belonging to the classes described above.

As examples of the neutral perfluoropolyethers, i.e., perfluoropolyethers containing perfluoroalkyl end groups, those belonging to the classes described above are used.

The polytetrafluoroethylene or the tetrafluoroethylene copolymer to be used in the present invention may be obtained by the methods indicated above.

The amount of polytetrafluoroethylene or of the tetrafluoroethylene copolymer in the mixture of protecting agents, according to the present invention, is generally within the range of from 2 to 30% by weight, relative to the total mixture. Preferably, the mixture comprises from 10 to 20% thereof.

The functionalized polyether, either alone, or if desired, in admixture with the polyether not containing functional groups, may be used as such, or it may be dissolved in a chlorofluorocarbon or fluorocarbon, as indicated above.

In those mixtures which contain polytetrafluoroethylene or a tetrafluoroethylene copolymer, the weight ratio of the functionalized perfluoropolyether or functionalized fluoropolyether to the neutral perfluoropolyether is equal to, or greater than 0.01. Such ratio is preferably within the range of from 0.1 to 0.6.

Inasmuch as polytetrafluoroethylene and the tetrafluoroethylene copolymers are neither soluble in perfluoropolyethers or fluoropolyethers, whether functionalized or not, nor in the above-mentioned solvents, they are incorporated into the mixture in the solid state as indicated above.

The application of the suspension of protective agents to the materials or buildings is carried out in the manner indicated above.

The amount of protecting agent to be applied to the surfaces to be protected is as indicated above.

Except for those cases in which products of polycondensation or ethylenic polymerization of functionalized perfluoropolyethers or fluoropolyethers are used, the protecting composition may be removed from the materials and buildings to which it was applied in the manner indicated above. The following examples are given merely for illustrative purposes, and are not to be regarded as limitative of the present invention.

EXAMPLE 1

Nine marble test pieces having a porosity of 1.7% are used. The test pieces have a size of 50×50×20 mm.

Test piece 1 is not treated. To the other test pieces, different protective compositions are applied by brush.

To test pieces 2 to 5, varying amounts of neutral perfluoropolyether Fomblin YR(®) and of polytetrafluoroethylene are applied. (To test piece 5 no polytetrafluoroethylene is applied).

The neutral perfluoropolyether Fomblin YR, manufactured by Montefluos S.p.A., has the formula:

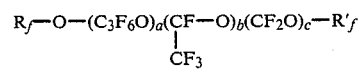

wherein: $R_f$ is $CF_3$ and $R'_f$ is $CF_3$.

Its average molecular weight is approximately 6,500.

To test pieces 6 to 9, varying amounts of a mixture of neutral perfluoropolyether Fomblin YR and of amidic functionalized perfluoropolyether are applied together with varying amounts of polytetrafluoroethylene (to test piece 9, no polytetrafluoroethylene is applied).

The ratio by weight of neutral perfluoropolyether to the amidic perfluoropolyether is 60:40.

The amidic perfluoropolyether has the formula:

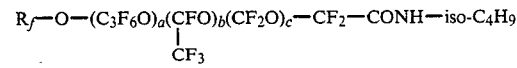

wherein: $R_f$ is $CF_3$. Its average molecular weight is approximately 5,000.

Polytetrafluoroethylene is Algoflon L206(®), manufactured by Montefluos S.p.A. The size of the primary particles of polytetrafluoroethylene is within the range of from 0.15 to 0.25 micron.

The amount of protective composition applied by brush-spreading to test pieces 2 to 9 is expressed as grams per square meter of surface area, and is reported below in Table 1A.

The efficacy of the treatment is evaluated on the basis of the amount of water absorbed by the various test pieces within 60 minutes and is expressed by the percent ratio: water absorbed by untreated test piece) less (water absorbed after treatment) divided by (water absorbed by untreated test piece).

The test is carried out by applying to a face of the test pieces a device consisting of a glass cylinder filled with water, and connected with a graduated micropipette which makes it possible to measure the amount of water absorbed by the surface of contact with the sample. Such equipment is described in the document published by Unesco-Rilem PEM Group with No. 78,182. The reading of the absorbed water is carried out at predetermined time intervals, and the quantity read is expressed as grams/cm² of surface area.

The amount of water absorbed by the various test pieces (expressed as grams/cm²) and the corresponding efficacy of the treatment are reported in Table 1A. According to the present invention yields better results than the use of either the neutral or the functionalized perfluoropolyether alone, even though a smaller amount of protective agent is used.

On some test pieces also the permeability to water vapor was determined. The permeability of the protective coatings to water vapor is a necessary feature, in that it enables any water which may be present under the coating to evaporate.

The measurement of water vapor permeability is carried out as follows: the test piece is fastened, by means of a sealing agent, to a plexiglas vessel, according to the arrangement as disclosed in European patent application No. 192,493.

Inside the vessel, 2.5 cm3 of water are previously introduced; the whole assembly is weighed and is then introduced inside a calcium-chloride desiccator.

At pre-established time intervals, the assembly constituted by the test piece and the vessel is weighed. The tests are run at the controlled constant temperature of 20° C. The test is discontinued after 144 hours, and the end weight losses are compared to those of the untreated sample, to which a permeability of 100% is attributed.

The test results are reported in Table 1B.

It will be observed that the protective compositions according to the present invention provide a permeability to water vapor slightly lower than that obtained with perfluoropolyether alone. However, such a permeability remains very good in that permeability values from 50% up are regarded as good.

TABLE 1A

| Test No. | Treated Material | Protective Agents (% by weight) | Amount of Applied Protective Agents | Absorbed Water Amount grams/cm² | Treatment Efficacy % |
|---|---|---|---|---|---|
| 1 | Marble | None | — | from 47.40 to 74.72 according to test | — |
| 2 | Marble | Fombliln YR 95% + PTFE 5% | 45 | 3.80 | 92 |
| 3 | Marble | Fombliln YR 90% + PTFE 10% | 56 | 2.92 | 95 |
| 4 | Marble | Fombliln YR 85% + PTFE 15% | 55 | 2.96 | 95 |
| 5 | Marble | Fombliln YR 100% | 81 | 21.20 | 71 |
| 6 | Marble | Amidic mixture 95% + PTFE 5% | 35 | 2.00 | 96 |
| 7 | Marble | Amidic mixture 90% + PTFE 10% | 33 | 2.56 | 95 |
| 8 | Marble | Amidic mixture 85% + PTFE 15% | 37 | 2.36 | 96 |
| 9 | Marble | Amidic mixture 100% | 59 | 16.96 | 84 |

TABLE 1B

| Test | Treated | Protective Agents (% by weight) | Amount of Applied Protective Agents | Treatment Efficacy % |
|---|---|---|---|---|
| 1 | Marble | None | — | 100% |
| 5 | Marble | Fomblin YR 100% | 81 | 85% |
| 2 | Marble | Fomblin YR 95% + PTFE 5% | 45 | 80% |
| 3 | Marble | Fomblin YR 90% + PTFE 10% | 56 | 80% |
| 4 | Marble | Fomblin YR 85% + PTFE 15% | 55 | 70% |

EXAMPLE 2

These tests are carried out on a sandstone having a porosity of 8.5%. The procedures are the same as those of Example 1, except that the test for water absorption is carried out in 30 minutes, and the permeability to water vapor is not determined.

The experimental data and the results are reported in Table 2.

TABLE 2

| Test No. | Treated Material | Protective Agents (% by weight) | Amount of Applied Protective Agents | Absorbed Water Amount grams/cm² | Treatment Efficacy % |
|---|---|---|---|---|---|
| 11 | Sandstone | None | — | from 211.48 to 250.64 according to test | — |
| 12 | Sandstone | Fomblin YR 95% + PTFE 5% | 101 | 21.44 | 90 |
| 13 | Sandstone | Fomblin YR 90% + PTFE 10% | 127 | 22.44 | 91 |
| 14 | Sandstone | Fomblin YR 85% + PTFE 15% | 119 | 8.36 | 96 |
| 15 | Sandstone | Fomblin YR 100% | 188 | 49.24 | 77 |
| 16 | Sandstone | Amidic mixture 95% + PTFE 5% | 74 | 8.20 | 96 |
| 17 | Sandstone | Amidic mixture 90% + PTFE 10% | 80 | 8.80 | 96 |
| 18 | Sandstone | Amidic mixture 85% + PTFE 15% | 79 | 5.40 | 98 |
| 19 | Sandstone | Amidic mixture 100% | 115 | 33.36 | 84 |

EXAMPLE 3

The tests of Example 2 are carried out on a Vicenza stone having a porosity of 30%.

EXAMPLE 3

The tests of Example 2 are carried out on a Vicenza stone having a porosity of 30%.

The experimental data and the results are reported in Table 3.

It will be observed that the mixtures of protective agents according to the present invention give a high treatment efficacy even in the case of very porous materials.

TABLE 3

| Test No. | Treated Material | Protective Agents (% by weight) | Amount of Applied Protective Agents | Absorbed Water Amount grams/cm² | Treatment Efficacy % |
|---|---|---|---|---|---|
| 21 | Vicenza Stone | None | — | from 2,015.48 to 2,212.48 | — |

TABLE 3-continued

| Test No. | Treated Material | Protective Agents (% by weight) | Amount of Applied Protective Agents | Absorbed Water Amount grams/cm² | Treat-ment Efficacy % |
|---|---|---|---|---|---|
| 22 | Vicenza Stone | Fromblin YR 95% + PTFE 5% | 365 | 116.52 according to test | 95 |
| 23 | Vicenza Stone | Fomblin YR 90% + PTFE 10% | 308 | 54.92 | 97 |
| 24 | Vicenza Stone | Fomblin YR 85% + PTFE 15% | 209 | 35.88 | 98 |
| 25 | Vicenza Stone | Fomblin YR 100% | 2,120 | 769.60 | 62 |
| 26 | Vicenza Stone | Amidic mixture 95% + PTFE 5% | 173 | 57.36 | 97 |
| 27 | Vicenza Stone | Amidic mixture 90% + PTFE 10% | 177 | 36.76 | 98 |
| 28 | Vicenza Stoned | Amidic mixture 85% + PTFE 15% | 181 | 34.04 | 98 |
| 29 | Vicenza Stone | Amidic mixture 100% | 2,354 | 608.00 | 69 |

EXAMPLE 4

The tests of Example 2 are repeated on a Lecce stone having a porosity of 42%.

The experimental data and the results are reported in Table 4.

TABLE 4

| Test No. | Treated Material | Protective Agents (% by weight) | Amount of Applied Protective Agents | Absorbed Water Amount grams/cm² | Treat-ment Efficacy % |
|---|---|---|---|---|---|
| 31 | Lecce Stone | None | — | from 2,146.80 to 2,514.20 according to test | — |
| 32 | Lecce Stone | Fomblin YR 95% + PTFE 5% | 199 | 233.72 | 91 |
| 33 | Lecce Stone | Fomblin YR 90% + PTFE 10% | 185 | 60.80 | 98 |
| 34 | Lecce Stone | Fomblin YR 85% + PTFE 15% | 194 | 23.36 | 99 |
| 35 | Lecce Stone | Fomblin YR 100% | 2,316 | 989.00 | 55 |
| 36 | Lecce Stone | Amidic mixture 95% + PTFE 5% | 174 | 54.04 | 98 |
| 37 | Lecce Stone | Amidic mixture 90% + PTFE 10% | 162 | 8.16 | 100 |
| 38 | Lecce Stone | Amidic mixture 85% + PTFE 15% | 152 | 2.52 | 100 |
| 39 | Lecce Stone | Amidic mixture 100% | 1,861 | 428.20 | 81 |

EXAMPLE 5

The tests were carried out on a concrete having 18% of porosity. The material was prepared by starting from: Portland 425 cement, using a water/cement ratio of 0.425 and a cement/inerts (sand and gravel) ratio of 0.3.

The protective agent is constituted by a mixture of a neutral perfluoropolyether, a carboxy-functionalized perfluoropolyether, and polytetrafluoroethylene.

The neutral perfluoropolyether is the same Fonmblin YR as in Example 1.

The functionalized perfluoropolyether has the formula:

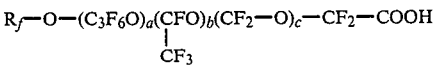

wherein $R_f$ is $-CF_3$, and has an average molecular weight of approximately 2,000.

The ratio of the functionalized perfluoropolyether relatively to the neutral perfluoropolyether is 20:80 parts by weight.

Mixtures are used which contain various amounts of Algoflon L206 polytetrafluoroethylene.

The procedure of Example 2 is followed.

The experimental data and the results obtained are reported in Table 5.

TABLE 5

| Test No. | Treated Material | Protective Agents (% by weight) | Amount of Applied Protective Agents | Absorbed Water Amount grams/cm² | Treatment Efficacy % |
|---|---|---|---|---|---|
| 41 | Concrete | None | — | from 3,860.80 to 5,130.40 according to test | — |
| 42 | Concrete | Carboxylic mixture 95% + PTFE 5% | 150 | 1,261.00 | 70 |
| 43 | Concrete | Carboxylic mixture 90% + PTFE 10% | 150 | 650.04 | 85 |
| 44 | Concrete | Carboxylic mixture 85% + PTFE 15% | 150 | 442.08 | 90 |
| 45 | Concrete | Carboxylic mixture 100% | 150 | 2,130.40 | 50 |

EXAMPLE 6

A slab of Carrara marble was used whose surface had a porosity of 0.3%. The slab had a thickness of 4 cm, with sides of 120×180 cm, and was subdivided into two portions with the same surface area. To one of said portions, an amount of FOMBLIN Y MET (a perfluoropolyether with perfluoroalkyl end groups made by Montefluos S.p.A.) of 80 grams/m² was applied.

The application was carried out by means of a brush, after a preliminary cleaning of the surface in order to remove any dust or foreign substances, by means of two successive operations, spaced out by approximately 70 hours.

Five days after the last application, the slab surface treated with the protecting agent was slightly darker and glossier than was the original surface before the treatment.

Next, the following operations were carried out: (a) "writing" tests, carried out by starting from the untreated surface portion, and proceeding towards the protected surface, by using:

1. Spraying of a quick-drying red nitrocellulose lacquer (a commercial can);

2. Spraying of a normal red lacquer (a commercial can);
3. Brush-painting with a red nitrocellulose lacquer;
4. White chalk of the blackboard type.

On the untreated surface, in all cases the writing action became evident, while on the protected surface portion, the following was respectively observed:

1. A uniform, barely perceptible trace, constituted by lacquer droplets, tending to coagulate;
2. As above, with the presence of coagula and immediate formation of large paint drops flowing downwardly;
3. The brush "slips", leaving an imperceptible trail of color;
4. Chalk "slips" without leaving any color.

(b) Cleaning test. Approximately 30 hours after the test (a), tests on the "written" surface were carried out. The test was carried out with dry cotton cloths soaked with acetone, and replaced by other clean cloths, as they became saturated with paint+solvent.

In case of the protected surface, the retained paint was fully and quickly removed, and the normal appearance of the marble was restored. In case of the untreated surface, the cleaning, besides being more toilsome, did not allow satisfactory results to be reached, owing to the persistence of evident color areas, caused by the imbibition of marble with the paint-solvent solution. The same cleaning results are also obtained when trichloroethylene is used as the solvent.

(COMPARATIVE) EXAMPLE 7

The test is carried out in the same way as disclosed above in Example 6, but the cleaning step (the (b) step) is carried out 90 days later. The cleaning of the parts treated with the protective agent does not yield satisfactory results, due to the persistence of color areas.

EXAMPLE 8

A set of plates of Carrara marble with a porosity of 1.5% were used, with each one of them being subdivided into two portions of equal surface area; to each of said portions, variable amounts of perfluoroalkyl-terminated perfluoropolyethers of Fomblin (®) Y type, of perfluoropolyethers with isobutyl ester (IBE) end groups, and of perfluoropolyethers with isobutyl-amide end groups (IBA) were applied.

The IBE-terminated perfluoropolyethers correspond to the general formula (E) wherein $R_f = CF_3$ and $D = CF_2COOC_4H_9$ (ISO), while the IBA-terminated perfluoropolyethers correspond to the general formula (E) wherein $R_f = CF_3$ and $D = CF_2COONH(C_4H_9)$ (ISO).

The application was carried out as reported above in Example 6.

Ninety days after the treatment, the following operations were carried out on the dry surfaces. (a) "writing" tests, carried out by starting from the untreated surface portion, and proceeding towards the protected surface portion, by using:

1. Spraying of a quick-drying red nitrocellulose lacquer (a commercial can);
2. Spraying of a normal red lacquer (a commercial can);
3. Brush-painting with a red nitrocellulose lacquer;
4. White chalk of the blackboard type On the untreated surface, in all cases the writing action became evident, while on the protected surface portion, the following was respectively observed:

1. A uniform, barely perceptible trace, constituted by lacquer microdroplets, tending to coagulate;
2. As above, with the presence of coagula and immediate formation of large paint drops flowing downwardly;
3. The brush "slips", leaving an imperceptible trail of color;
4. Chalk "slips" without leaving any color.

(b) Cleaning test. Approximately 72 hours later than test (a), tests on the "written" surface were carried out. The test was carried out with dry cotton cloths soaked with acetone, and replaced by other clean cloths, as they became saturated with paint+solvent.

In the case of the protected surface, the retained paint was fully and quickly removed, and the normal appearance of the marble was restored. In case of the untreated surface, the cleaning, besides being more toilsome, does not make it possible for satisfactory results to be reached due to the persistence of evident color areas, caused by the imbibition of marble with the paint-solvent solution.

The following Table 6 is a synoptic table of the results:

| Plate No. | 1 | 2 | 3 | 4 |
|---|---|---|---|---|
| Product and g/m² | Untreated | Y MET 80 g/m² | IBE 50 g/m² | IBA 50 g/m² |
| Results after Cleaning | Evident traces | Slight halo | Complete disappearance | Complete disappearance |

EXAMPLE 9

A set of small plates of Vicenza Stone (an organogen limestone) was used, which had a porosity of 30%, subdivided into two portions having the same surface area, to each of which variable amounts were applied of perfluoroalkyl-terminated perfluoro-polyethers of FOMBLIN(®) Y MET type, and of IBE-terminated and IBA-terminated perfluoropolyethers as described in Example 8, as well as of a mixture containing 85% by weight of isobutylamino-terminated perfluoropolyethers and 15% of fine PTFE powder, and finally of perfluoropolyethers (A1) having the formula of the above-indicated (E) type, wherein $R_f = CF_3$ and $D = CF_2COOH$.

Ninety days after the treatment the following operations were carried out on the dry surface:
(a) writing tests; and
(b) cleaning tests, Ninety days after the treatment the following operations were carried out on the dry surface:
(a) writing tests; and
(b) cleaning tests,
according to the same procedures as set out in previous exmples. In particular, the cleaning tests were carried out 72 hours after the writing test.

The results obtained are as shown in the following Table 7.

TABLE 7

| Plate No. | 1 | 2 | 3 | 4 | 5 | 6 |
|---|---|---|---|---|---|---|
| Product and g/m² | Untreated | Y MET 600 g/m² | IBE 300 g/m² | IBA 400 g/m² | IBA + PTFE 200 g/m² | Al 150 g/m² |
| Results after Cleaning | Paint persistence | Toned down image | Light halo | Light halo | Complete disappearance | Complete disappearance |

What is claimed is:

1. Process for the protection of stone materials, marble, bricks and concrete, and of structures obtained with such materials, from atmospheric agents and pollutants, by the application of protective agents on the surface of said materials and structures, characterized in that the protective agents comprise a mixture of:
   (1) polytetrafluoroethylene, or a tetrafluoroethylene copolymer containing up to 12 mol % of other perfluorinated monomers, said homopolymer or copolymer being used as a fine powder;
   (2) a perfluoropolyether not bearing functional groups; and/or;
   (3) a perfluoropolyether or a fluoropolyether having a chain end, or both chain ends, constituted by a functional group capable of forming a chemical and/or physical bond with the material to be protected, or a product of polycondensation or ethylenic polymerization of the said functionalized perfluoropolyether or fluoropolyether;
   wherein the amount of (1) present is 2–30% by weight of the mixture, and the weight ratio of (3) to (2) is 0.1–0.6 when (2) and (3) are both present.

2. Process according to claim 1, characterized in that the average size of the primary particles of tetrafluoroethylene homopolymer or copolymer is within the range of from 0.05 to 0.5 micron.

3. Process according to claim 1 or 2, characterized in that the average molecular weight of the tetrafluoroethylene homopolymer or copolymer is within the range of from 100,000 to 2,000,000.

4. Process according to claim 1 or 2, characterized in that the average molecular weight of the perfluoropolyether not containing functional groups is within the range of from 3,000 to 16,000.

5. Process according to claim 1 or 2, characterized in that the perfluoropolyether or fluoropolyether having a chain end, or both chain ends, constituted by a functional group, has an average molecular weight within the range of from 500 to 20,000.

6. Process according to claim 1 or 2, characterized in that the perfluoropolyether not bearing functional groups, or the perfluoropolyether having a chain end, or both chain ends, constituted by a functional group, contain repeating oxyperfluoroalkylene units selected from the group consisting of:
   (I) ($CF_2$—$CF_2O$) and ($CF_2O$), such units being randomly distributed throughout the perfluoropolyether chain;
   (II)

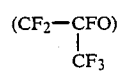

and (CFXO) wherein X is either F or $CF_3$, said units being randomly distributed throughout the chain;
   (III) ($CF_2$—$CF_2O$),

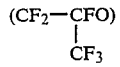

and (CFXO) wherein X is either F or $CF_3$, such units being randomly distributed throughout the chain;
   (IV)

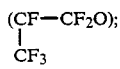

(V) ($CF_2$—$CF_2$—$CF_2O$);
   (VI)

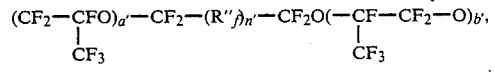

wherein $R''_f$ is a fluoroalkylenic group; n' is either 0 or 1; a' and b' are integers, and the sum of (a'+b') is equal to or higher than 2;
   (VII) ($CF_2$—$CF_2O$);
   (VIII)

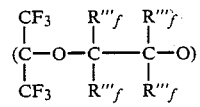

wherein the $R'''_f$ groups, either equal to or different from one another, are a fluorine atom or a perfluoroalkyl group;
   (IX) ($CF_2O$—$CF_2$—$CF_2O$).

7. Process according to claim 1 or 2, characterized in that the fluoropolyether having a chain end, or both chain ends, constituted by a functional group, has units selected from the group consisting of:
   (X) ($CH_2$—$CF_2$—$CF_2O$); and
   (XI) ($CF_2$—$CF_2$—$CH_2O$)$_{p'}$—$R^{iv}_f$—O—($CH_2$—$CF_2$—$CF_2O$)$_q$, wherein $R^{iv}_f$ is a fluoroalkylenic group and p' and q' are zero, or integers, and the sum of (p'+q') is equal to or higher than 2.

8. Process according to claim 1 or 2, characterized in that the perfluoropolyether not bearing functional groups is selected from one of the following classes:
   (A)

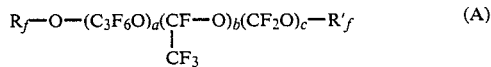

wherein: $R_f$ and $R'_f$, either equal to or different from each other, are selected from the group consisting of $CF_3$, $C_2F_5$ and $C_3F_7$; the $C_3F_6O$ (oxytrifluoromethyltrifluoroethylene),

and CF$_2$O units are randomly distributed throughout the chain; a is an integer; b and c are integers or zero; when the sum of (b+c) is different from zero, the a/(b+c) ratio is within the range of from 5 to 40; and the average molecular weight is within the range of from 4,000 to 10,000;

(B) CF$_3$O—(C$_2$F$_4$O)$_d$(CF$_2$O)$_e$—CF$_3$ wherein the C$_2$F$_4$O and CF$_2$O units are randomly distributed throughout the chain; d and e are integers; the d/e ratio is within the range of from 0.3 to 5; the average molecular weight is within the range of from 3,000 to 16,000;

(C) CF$_3$O—(C$_3$F$_6$O)$_f$(C$_2$F$_4$O)$_g$(CFXO)$_h$—CF$_3$ wherein the C$_3$F$_6$O, C$_2$F$_4$O and CFXO units are randomly distributed throughout the chain; f, g and h are integers; the f/(g+h) ratio is within the range of from 1 to 50; the g/h ratio is within the range of from 1 to 10; X is F or CF$_3$; and the average molecular weight is within the range of from 4,000 to 12,000;

(D) R$^3{}_f$O—(CF$_2$CF$_2$CF$_2$O)$_j$R$^4{}_f$ wherein R$^3{}_f$ and R$^4{}_f$, either equal to or different from each other, are —CF$_3$ or —C$_2$F$_5$; and j is an integer having such a value that the average molecular weight is within the range of from 4,000 to 16,000.

9. Process according to claim 1 or 2, characterized in that the perfluoropolyether having a chain end, or both chain ends, constituted by a functional group capable of forming a chemical and/or physical bond with the material to be protected, is selected from one of the following classes:

(E)

wherein: R$_f$ is a perfluoroalkyl group containing from 1 to 3 carbon atoms; the C$_3$F$_6$O,

and CF$_2$O units are randomly distributed throughout the chain; a is an integer; b and c are integers or zero; when the sum of (b+c) is different from zero, the a/(b+c) ratio is within the range of from 5 to 40; D is a —CFX—COZ' group, wherein X=F or CF$_3$ and Z'=OH, OR$^5$ or NR$_6$R$_7$, wherein R$_5$ is an alkyl group containing from 1 to 8 carbon atoms, an aromatic group or an alkylaromatic group, wherein the aromatic group may be substituted with alkyl groups or polyethoxy groups; the average molecular weight is within the range of from 500 to 10,000;

(F) D'—(C$_2$F$_4$O)$_d$(CF$_2$O)$_e$—D' wherein the C$_2$F$_4$O and CF$_2$O units are randomly distributed through the chain; d and e are integers; the d/e ratio is within the range of from 0.3 to 5; D'=CF$_2$—COZ', wherein Z' has the above meaning; the average molecular weight is within the range of from 1,000 to 20,000;

(G)

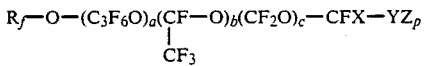

wherein: R$_f$ is a perfluoroalkyl group containing from 1 to 3 carbon atoms; the C$_3$F$_6$O,

and CF$_2$O units are randomly distributed throughout the chain; a is an integer; b and c are integers or zero; when the sum of (b+c) is different from zero, the a/(b+c) ratio is within the range of from 5 to 40; p may be 1 or 2; Y is either a divalent or a trivalent bridging organic radical; the average molecular weight is within the range of from 500 to 10,000; Z is a functional radical capable of forming a chemical and/or physical bond with the material to be protected, and is selected from the group consisting of Z$^1$, Z$^2$, Z$^3$, Z$^4$, wherein: Z1: a non-aromatic, non-fluorinated organic radical not containing active hydrogen atoms, containing two or more heteroatoms, either equal to or different from one another, and selected from O, N, S, Se and P, which are donors of electronic doublets and are situated in 1-3, 1-4 or 1-5 position relative to one another, or an aromatic radical either containing or not containing heteroatoms, selected from those indicated above, capable of generating coordination or charge-transfer bonds; Z2 is a —CONR$^9$R$^{10}$ or —COOR$^{11}$ radical, wherein R$^{11}$ is an alkyl group containing from 1 to 8 carbon atoms, an aromatic group or an alkylaromatic group, wherein the aromatic group may be substituted with alkyl groups or polyethoxy groups. R$^9$ and R$^{10}$, either equal to or different from each other, have the same meaning as R$^{11}$; or a radical

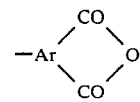

wherein Ar is an aromatic group; or an —OH; —NCO;

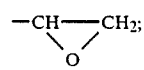

—NHR$^{11}$; —COR$^{11}$; —SiR$^{12}{}_t$(OR$^{13}$)$_{3-t}$ radical, wherein R$^{12}$ and R$^{13}$, either equal to or different from each other, have the same meaning as R$^{11}$, and where t is zero, 1 or 2; Z3 is a radical containing a polymerizable unsaturation of ethylenic type; Z4: a radical of the Z$^1$ class, containing one or more R$^{11}$ substituents, wherein R$^{11}$ has the same meaning as above indicated;

(H) AO—(C$_2$F$_4$O)$_k$(CF$_2$O)$_l$—A' wherein the C$_2$F$_4$O and CF$_2$O units are randomly distributed throughout the chain; k and l are integers; the k/l ratio is within the range of from 0.3 to 5; A' is —CFX—YZ$_p$; A is A' or a perfluoroalkyl radical containing from 1 to 3 carbon atoms; p, X, Y and Z have the same meanings as stated above; the average molecular weight is within the range of from 1,000 to 20,000;

(J) AO—$(C_3F_6O)_f(C_2F_4O)_g(CFXO)_h$—A' wherein the $C_3F_6O$, $C_2F_4O$ and CFXO units are randomly distributed throughout the chain; f, g and h are integers; the f/(g+h) ratio is within the range of from 1 to 50; the g/h ratio is within the range of from 1 to 10; A, A' and X have the same meanings as stated above; the average molecular weight is within the range of from 500 to 20,000; and (K)

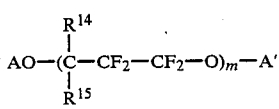

wherein $R^{14}$ and $R^{15}$, either equal to or different from each other, are selected from H, Cl and F; a fluorine atom in —$CF_2$— moieties may be substituted by H, Cl, a perfluoroalkoxy group or a perfluoroalkyl group; when the compound contains

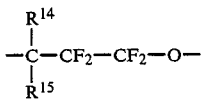

units which are different from one another, these units are randomly distributed throughout the chain, m is an integer such that the average molecular weight is within the range of from 1,500 to 8,000.

10. Process according to claim 1 or 2, characterized in that the $Z^3$ radical is selected from methacryl, acryl, cinnamic, vinyl, allyl, vinylether, and allylether radicals.

11. Process according to claim 1 or 2, characterized in that the organic bridging radical Y is selected from the group consisting of: —$CH_2O$—, —$CH_2$—O—$CH_2$—, —$CH_2(OCH_2CH_2)_n$ (wherein n is an integer within the range of from 1 to 3), —$CF_2$—, —$CF_2O$—, —$CH_2$—, —$CONR^{11}$—, —COO—, —COS—, —CO—, —$CH_2NR^{11}$—, —$CH_2S$—, wherein $R^{11}$ is an alkyl group containing from 1 to 8 carbon atoms, an aromatic group or an alkylaromatic group, wherein the aromatic group may be substituted with alkyl groups or polyethoxy groups.

12. Process according to claim 1, characterized in that the mixture of protective agents contains from 10 to 20% by weight of tetrafluoroethylene homopolymer or copolymer.

13. Process according to claim 1 or 2, characterized in that the perfluoropolyether not bearing functional groups and/or the perfluoropolyether or the fluoropolyether having a chain end, or both chain ends, constituted by a functional group, are used in the form of a solution thereof in a chlorofluorocarbon or a fluorocarbon.

14. Process according to claim 13, characterized in that the chlorofluorocarbon is 1,1,2-trichloro-1,2,2-trifluoroethane.

15. Process according to claim 1 or 2, characterized in that the amount of protective agents applied to the materials or structures to be protected is within the range of from 10 to 500 grams per square meter of surface area to be treated.

16. Process for protecting materials for building industry and linings, from paints, inks and the like, consisting essentially in applying to the surface of such materials having porosity values not higher than 40%, a coating constituted by a perfluoropolyether or a fluoropolyether having a chain end or both chain ends constituted by a functional group capable of forming a chemical and/or physical bond with the material to be protected; wherein such perfluoropolyether contains oxaperfluoroalkylene units selected from the following classes:

(I) ($CF_2$—$CF_2O$) and ($CF_2O$), such units being randomly distributed throughout the perfluoropolyether chain;

(II)

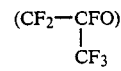

and (CFXO) wherein X is either F or $CF_3$, such units being randomly distributed throughout the perfluoropolyether chain;

(III) ($CF_2$—$CF_2O$),

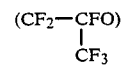

and (CFXO) wherein X is either F or $CF_3$, such units being randomly distributed throughout the perfluoropolyether chain (IV)

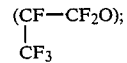

(V) ($CF_2$—$CF_2$—$CF_O$);
(VI)

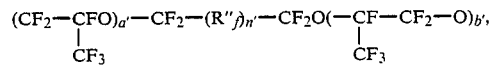

wherein: $R''_f$ is a fluoroalkylene group; n' is either 0 or 1; a' and b' are integers, and the sum of (a'+b') is equal to or higher than 2;

(VII) ($CF_2$—$CF_2O$);
(VIII)

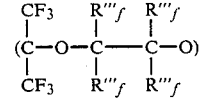

wherein the $R'''_f$ groups, which may be either equal to or different from one another, are a fluorine atom or a perfluoroalkyl group; and (IX) ($CF_2O$—$CF_2$—$CF_2O$); and wherein the fluoropolyether contains the following units:

(X) ($CH_2$—$CF_2$—$CF_O$); or (XI) ($CF_2$—$CF_2$—$CH_2O)_{p'}$—$R^{iv}_f$—O—($CH_2CF_2$—$CF_2O)_{q'}$ wherein: $R^{iv}_f$ is a fluoroalkylene group, and p' and q' are zero or integers, and the sum of (p'+q') is equal to or higher than 2;

such perfluoropolyether or fluoropolyether being used either alone or in admixture with a compound selected from one of the two following classes or with a compound from both these classes;
(1) 2-30% by weight of polytetrafluoroethylene or a tetrafluoroethylene copolymer containing up to 12 mol % of other perfluorinated monomers, with said homopolymer or copolymer being used in a fine powder form;
(2) 10-20% by weight of a perfluoropolyether having perfluoroalkyl end groups.

17. Process according to claim 16, wherein the tetrafluoroethylene copolymer contains up to 10 mol % of hexafluoropropene, and up to 5 mol % of perfluoroalkylperfluorovinyl ether.

* * * * *